United States Patent

Suzuki et al.

Patent Number: 6,163,509
Date of Patent: Dec. 19, 2000

[54] MAGNETO-OPTICAL RECORDING MEDIUM AND MAGNETO-OPTICAL RECORDER USING THE MEDIUM

[75] Inventors: Takao Suzuki; William Van Drent, both of Nagoya, Japan

[73] Assignees: Toyota Jidosha Kabushiki Kaisha, Toyota; Toyota School Foundation, Nagoya, both of Japan

[21] Appl. No.: 09/220,767

[22] Filed: Dec. 28, 1998

Related U.S. Application Data

[63] Continuation of application No. PCT/JP97/02415, Jul. 11, 1997, abandoned.

[30] Foreign Application Priority Data

Jul. 11, 1996 [JP] Japan ..... 8-182019

[51] Int. Cl.$^7$ ..... G11B 11/00
[52] U.S. Cl. ..... 369/13; 428/694 ML
[58] Field of Search ..... 369/13, 14, 110, 369/116; 360/59, 114; 365/122; 428/694 ML

[56] References Cited

U.S. PATENT DOCUMENTS

| | | | |
|---|---|---|---|
| 3,928,870 | 12/1975 | Ahrenkiel et al. | 360/59 |
| 5,161,133 | 11/1992 | Levenson | 369/13 |
| 5,432,760 | 7/1995 | Yoshizawa et al. | 369/13 |
| 5,852,591 | 12/1998 | Fukumoto | 369/13 |
| 5,853,872 | 12/1998 | Shimamori et al. | 428/332 |

FOREIGN PATENT DOCUMENTS

| | | |
|---|---|---|
| 3-95742 | 4/1991 | Japan . |
| 3-152739 | 6/1991 | Japan . |
| 4-121835 | 4/1992 | Japan . |
| 4-274039 | 9/1992 | Japan . |
| 5-243659 | 9/1993 | Japan . |
| 6-112044 | 4/1994 | Japan . |
| 7-57309 | 3/1995 | Japan . |
| 7-57310 | 3/1995 | Japan . |
| 7-57311 | 3/1995 | Japan . |
| 7/57312 | 3/1995 | Japan . |
| 7-141708 | 6/1995 | Japan . |

OTHER PUBLICATIONS

JPN. J. Appl. Phys., vol. 32 (1993) pp. 989–995, Part 1, No. 2, Feb. 1993: *Magnetooptical Kerr Spectrometer for 1.2–5.9 eV Region and its Application to FePt/Pt Multilayers*, Katsuaki Sato et al.

Proceedings of Magneto–Optical Recording International Symposium '94, J. Magn. Soc. JPN., vol. 19, Supplement No. S1 (1995), pp. 267–270: *Microstructural, Magnetic and Magneto–Optical Properties of (100) and (111) Oriented Thick "FCC" Cobalt Single Crystal*.

Physical Review B, vol. 48, No. 22, 1993, The American Physical Society, Dec. 1, 1993: *Magneto–optical properties of Fe–Pt alloy films in the range 1.55–10.5 eV*, Toshio Sugimoto et al.

*Primary Examiner*—Tan Dinh
*Attorney, Agent, or Firm*—Kenyon & Kenyon

[57] ABSTRACT

A Co thin film 14 is formed through evaporation on a Si substrate 10 having a Cu sheet layer 12 between the film 14 and the substrate 10. The Si substrate 10 with an orientation (100) or (111) is used. The thickness of the Cu seed layer (12) and the Co thin film (14) are both approximately 100 nm. The Co thin film (14) is a single crystal thin film having a face-centered cubic lattice structure with an orientation of (100) or (111). The thus structured Co thin film 14 has the maximum 0.4° polar Kerr rotation angle with respect to ultraviolet light having a wavelength of 200–230 nm.

9 Claims, 9 Drawing Sheets

MAGNETO-OPTICAL RECORDING MEDIUM AND MAGNETO-OPTICAL RECORDER USING THE MEDIUM

This is a continuation of International Application PCT/JP97/02415, with an international filing date of Jul. 11, 1997, now abandoned.

TECHNICAL FIELD

The present invention relates to a magneto-optical recording medium for recording information by utilizing magneto-optical effects of a metallic thin film, and to a magneto-optical recorder using the medium and ultraviolet light.

BACKGROUND ART

Conventionally, magneto-optical recording has been known in which an amorphous film, such as TbFeCo (terbium, iron, cobalt), a Bi (bismuth)-substitutional garnet thin film, and a metallic thin film, such as CoPt (cobalt, platinum), are used as a recording medium. These metallic thin films have vertical magnetic anisotropy and a significant polar Kerr rotation angle or Kerr ellipticity (e.g., 0.1° or over) as magneto-optical effect with respect to visible light of 400–860 nm. Therefore, these metallic thin films are used as a magneto-optical recording medium.

On the other hand, an increase of recording density is always required to recording media. Although a magneto-optical recording medium is adaptable for higher-density recording compared to a conventional magnetic recording medium, still higher-density recording is desired.

An increase of recording density requires the use of light having a short wavelength. That is, short waves must be used to increase a resolution, which is determined according to the wavelength of light in use.

However, it is known that although a TbFeCo thin film, which is currently widely used as a magnetic recording medium, has a polar rotation angle of 0.3° or over with respect to infrared radiation, the polar rotation angle becomes significantly smaller as the wavelength becomes shorter. Therefore, a TbFeCo thin film cannot be used for magneto-optical recording which uses short waves such ultraviolet light.

A measurement device for magneto-optical effects generally employs a xenon lamp as a light source. However, the light intensity of a xenon lamp is weak for wavelengths of 300 nm or less, and remarkably weak for wavelengths of 200 nm or less. Therefore, this device is substantially useless for measurement in an ultraviolet region. Various reports on magneto-optical effects are available, but are limited to the regions of light having longer wavelengths than that of visible light.

According to Jpn. J. Appl. Phys. Vol. 21(1993) Pt.1, No.2, pp.989–995, Proceedings of Magneto-Optical Recording International Symposium '94, J. Magn. Soc. Jpn., Vol. 19, Supplement No. S1(1995), pp, 267–270, measurement results as to magneto-optical effects of Fe- and Co-related materials are available with respect to a wavelength of about 200 nm. However, these documents merely confirm the fact that a polar rotation angle is very small for a wavelength of about 200 nm. Also, according to Physical Review B Vol. 48, No. 22, 1993 The American Physical Society, a search result as to magneto-optical effects of iron-related material is available with respect to the waves in an ultraviolet region and longer waves. However, this report is concerned only with extremely limited Fe-related material without vertical magnetic anisotropy, which is far from being usable as a magneto-optical recording medium which uses ultraviolet light.

DISCLOSURE OF INVENTION

The present invention has been conceived in view of the above, and aims to provide a magneto-optical recording medium having preferable magneto-optical effects with respect to ultraviolet light and a magneto-optical recorder using the medium.

The inventors began with development of a device for measuring magneto-optical effects in an ultraviolet region with respect to various materials, and succeeded in developing a preferable device, which is disclosed in Japanese Patent Application Laid-open No. Hei 8-96887. Using this device, the inventors measured magneto-optical effects in an ultraviolet region with respect to various materials, and succeeded in obtaining a recording medium of the present invention.

According to the present invention, there is provided a magneto-optical recording medium for recording information by utilizing magneto-optical effects of a metallic thin film; the magneto thin film comprising Co, the magneto-optical effect is a polar Kerr rotation angle and/or Kerr ellipticity which have/has an absolute value of 0.1° or over with respect to ultraviolet light having a wavelength of 400 nm or less.

The aforementioned Co-related thin film has a polar Kerr rotation angle which is negative with respect to visible light, and shifts to positive when it receives irradiating light with a shorter wavelength until it has a large polar Kerr rotation angle. Also, this material has a coercive force large enough to maintain magneto-electric effects.

Therefore, when utilizing the aforementioned characteristics, recording and reproduction using a spot having a small diameter is achieved using ultraviolet light. Using this material for a magneto-electric recording medium, it is possible to significantly increase the recording density.

According to the present invention, the metallic thin film has vertical magnetic anisotropy which is a magnetic anisotropy in a normal direction of the thin film.

A Co-related thin film has vertical magnetic anisotropy. Therefore, by utilizing this characteristic, it is possible to obtain a magneto-optical recording medium with high density.

According to the present invention, the metallic thin film is a Co crystalline thin film having a crystalline structure of a face-centered cubic lattice structure.

Crystal having a face-centered cubic lattice structure has a large Kerr rotation angle of approximately 0.4° in an ultraviolet region having a wavelength of about 200 nm (185–248 nm).

According to the present invention, the metallic thin film is a Co crystalline thin film having a crystalline structure of a hexagonal close-packed lattice structure.

The film of a hexagonal close-packed lattice structure has a Kerr rotation angle of about 0.3° with respect to a wavelength of about 200 nm.

According to the present invention, the metallic thin film is a $Co_{100-x}Rx$ (X is a desired number under 100, here) alloy crystalline thin film, R containing at least one of transition metals, rare-earth elements, Pt, Ta, Zr, Nb, Mo, Ru, Rh, Pd, Ag, Au, and W.

According to the present invention, the metallic thin film is a multi-layered film including a Co crystalline thin film and a crystalline thin film with R components, R may be at least any one of transition metals, rare-earth elements, Pt, Ta, Zr, Nb, Mo, Ru, Rh, Pd, Ag, Au, and W.

Here, transition metal may preferably be one or more of Ti, V, Cr, Mn, Fe, Ni, Cu, and Zn, while rare-earth element may be one or more of Ce, Pr, Nd, Pm, Sm, Eu, Gd, Tb, Dy, Ho, Er, Tm or Tb.

The thus formed alloy crystalline thin film or a multi-layered film has a large positive polar Kerr rotation angle in an ultraviolet region as described above.

According to the present invention, the metallic thin film has a magneto-optical effect which is a polar Kerr rotation angle and/or Kerr ellipticity which are/is 0.1° or over with respect to ultraviolet light having a wavelength of 200 nm or.

Using ultraviolet light of 200 nm or under, high density recording can be achieved. Also, a Co-related thin film has a large polar Kerr rotation angle in this region.

According to the present invention, the metallic thin film has a negative Kerr rotation angle in most of a visible light region, and a positive polar Kerr rotation angle of 0.1° or over in a visible light region or an ultraviolet region with a short wavelength.

A Co-related thin film has a Kerr rotation angle which is negative in a visible light region and shifts to positive in an ultraviolet region while increasing the value thereof. Therefore, while using ultraviolet light in this region, favorable recording can be achieved.

According to the present invention, there is provided a magneto-optical recording medium which utilizes a magnetic recording medium including a Co-related thin film having a large magneto-optical effect with respect to the aforementioned ultraviolet light, comprising irradiation means for irradiating ultraviolet light of 400 nm or less wavelength onto a magneto-optical recording medium, and a vessel for enclosing the magneto-optical recording medium in an atmosphere with a small rate of ultraviolet absorption.

Ultraviolet light is absorbed by oxygen. Therefore, in a nitrogen atmosphere, absorption of ultraviolet light is suppressed so that a preferable operation is achieved. Note that when using ultraviolet light having a shorter wavelength, it is preferable to have a helium atmosphere or a vacuum.

Further, in a magneto-optical recording device of the present invention, the irradiation means includes frequency doubling means for converting light supplied from a light source into light having a halved wavelength by means of frequency doubling, and the magneto-optical recording means is irradiated by the light from the light source after halving the wavelength thereof.

When utilizing such frequency doubling, it is possible to obtain laser light in an ultraviolet region by using a semiconductor laser as a light source.

BEST MODE FOR CARRYING OUT THE INENTION

In the following, a preferred embodiment of the present invention (hereinafter referred to as a preferred embodiment) will be described based on the drawings.

FIRST PREFERRED EMBODIMENT

Figure 1:
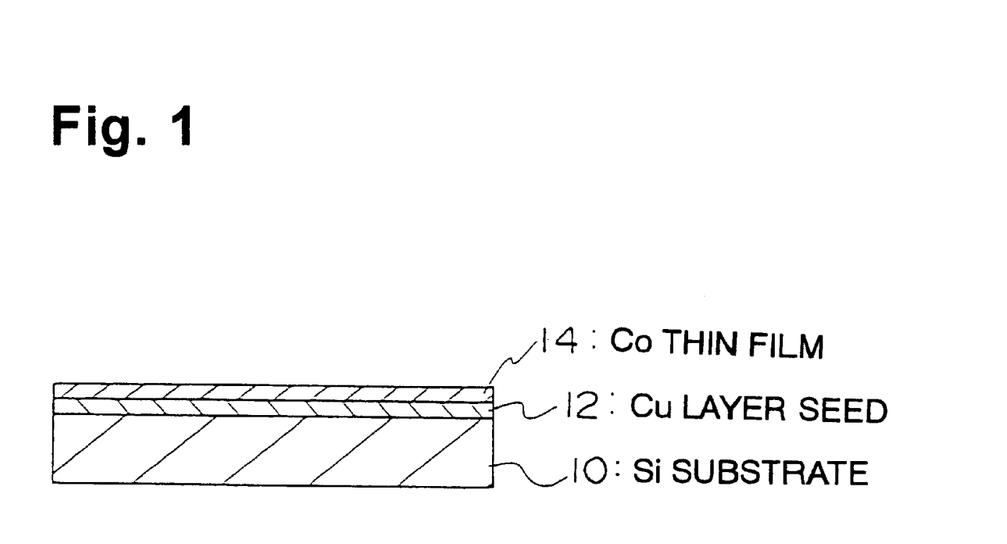
FIG. 1 is a diagram showing a schematic structure of a magneto-optical recording medium according to a first preferred embodiment.

FIG. 1 shows a structure of one preferred embodiment, in which a Co thin film is formed through evaporation on an Si substrate 10 having a Cu sheet layer 12 between the Co film and the Si substrate 10. The Si substrate 10 with an orientation (100) or (111) is used. The thickness of the Cu seed layer (12) and the Co thin film (14) are both approximately 100 nm. The Co thin film (14) is a single crystal thin film having a face-centered cubic lattice structure with an orientation of (100) or (111).

A Co thin film 14 having the above structure has a polar Kerr rotation angle of the maximum 0.4 ° with respect to ultraviolet light having a wavelength 200–230 nm. Also, the Co thin film 14 has sufficient hysteresis (coercive force) with respect to changes of a magnetic field. Therefore, high-density information recording is achieved by utilizing this polar Kerr rotation angle.

Here, an example method for forming a Co thin film will be described. Initially, two types of Si substrates (10), i.e., one comprising Si single crystal with the orientation of (100) and the other with the orientation of (111), are prepared, and the surfaces of the substrates (10) are etched with HF (hydrogen fluoride) to thereby remove the oxide layer thereon. Then, a Cu seed layer 12 and a Co thin film 14 are sequentially formed through evaporation on each of the two types of Si substrates 10. The evaporation is carried out by means of electron beam evaporation under highly evacuated conditions at a pressure of $10^{-7}$ Torr or less. An evaporation speed is set at 1 nm/sec.

According to X-ray diffraction, it is found that the Cu seed layer 12 and Co thin film layer 14 formed on the Si substrate 10 comprising Si (100) are single crystal having a face-centered cubic lattice structure (fcc) including a (100) face arranged parallel with the substrate, while those formed on the Si substrate 10 comprising Si (111) are single crystal having a face-centered cubic lattice structure (fcc) including a (111) face parallel with the substrate.

Also, observation using an electron microscope with high resolution proves that they are single crystal, similar to the X-ray diffraction. It is found that the interface between the Co thin film 14 and the Cu seed layer 12 and that between the Cu seed layer 12 and the Si substrate 10 are flat in the atomic scale. Also, according to Auger molecular spectroscopy, it is confirmed that impurities within the regions for the Co thin film 14 and the Cu sheet layer 12 are substantially negligible. This result corresponds to the result obtained in a Rutherford scattering experiment.

As described above, it is found that the Co thin film 14 of this example is Co single crystal without impurities.

Figure 2:
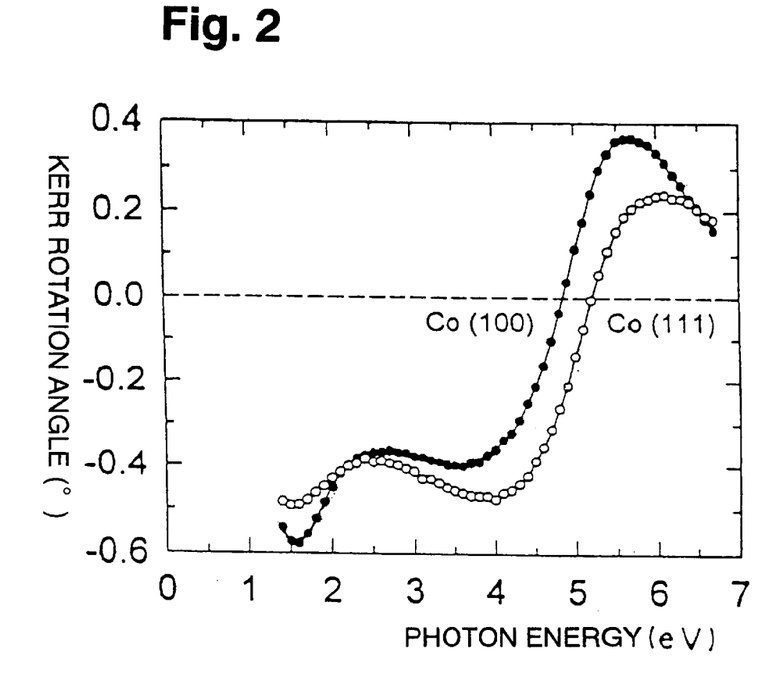
FIG. 2 is a diagram showing the relationship between photon energy and a polar Kerr rotation angle in a magneto-optical recording medium according to the first preferred embodiment.

Next, magneto-optical effects of the thus obtained material will be described. FIG. 2 shows dependency of a polar Kerr rotation angle on photon energy. Both Co (100) and Co (111) show a large peak of polar Kerr rotation angle with respect to photon energy between 6.7–5.2 eV (185 nm–238 nm). The maximum value is 0.4° for Co (100) and 0.2° for Co (111).

Figure 3:
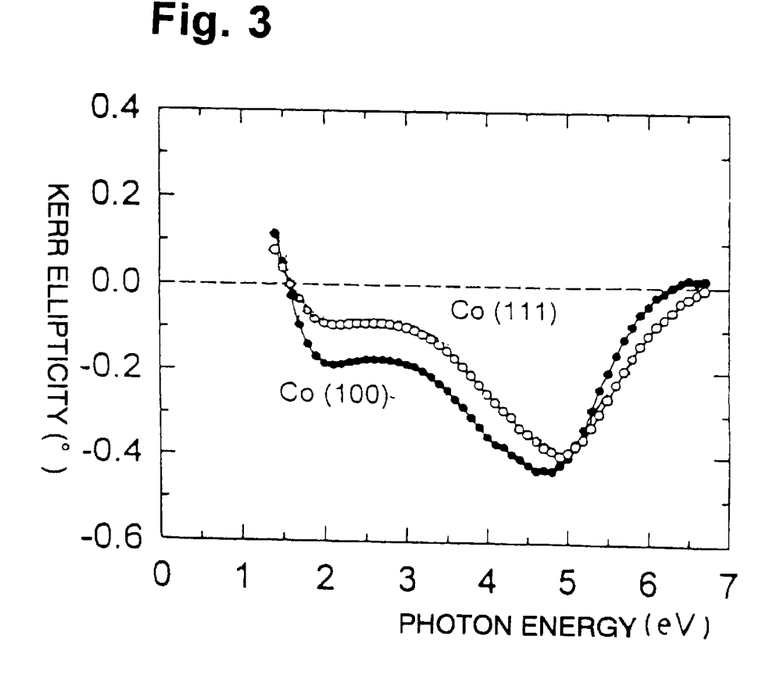
FIG. 3 is a diagram showing the relationship between photon energy and Kerr ellipticity in a magneto-optical recording medium according to the first preferred embodiment.

In particular, it is almost impossible to estimate this peak through conventional access as it is caused after a rotation angle shifts from negative to positive with increasing photon energy (decreasing of a wavelength). Note that Kerr ellipticity presents so small a value that it can be considered 0° within the aforementioned range, as shown in FIG. 3.

Figure 4:
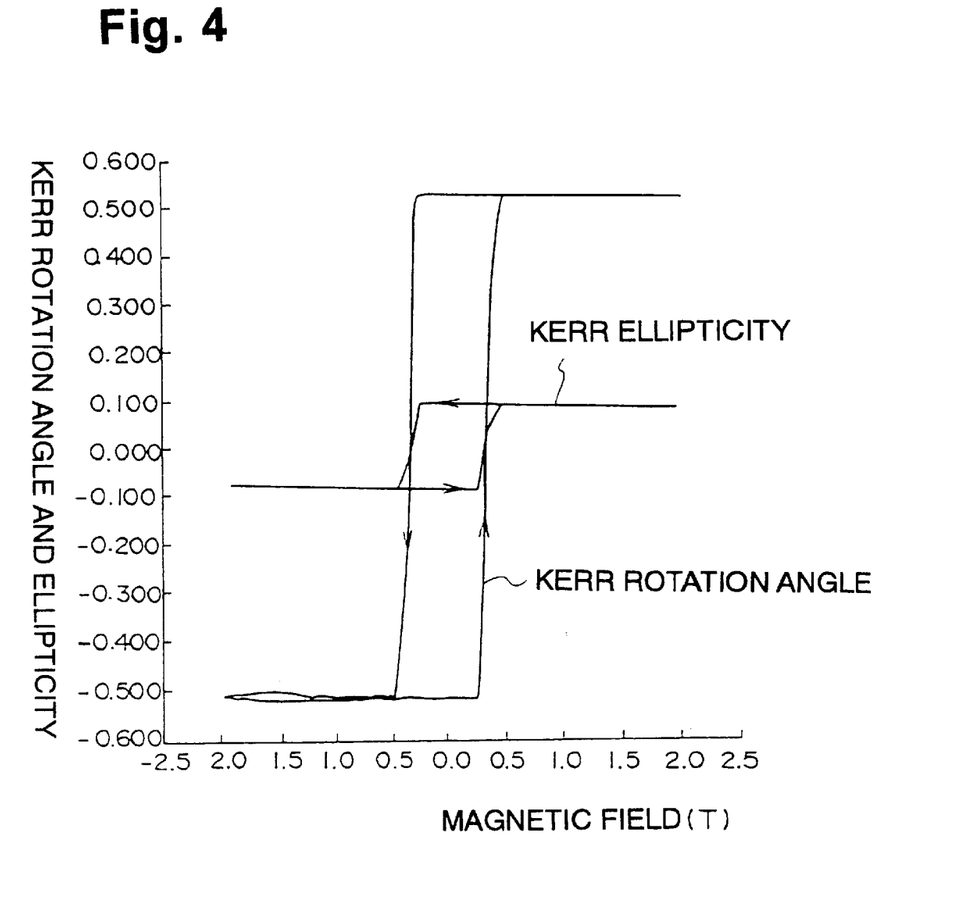
FIG. 4 is a diagram showing hysteresis with respect to changes of a magnetic field in a magneto-optical recording medium according to the first preferred embodiment.

FIG. 4 shows hysteresis characteristics of the Co thin film 14. As is shown, a polar Kerr rotation angle and a Kerr ellipticity present hysteresis of about ±0.3T between changes from the negative magnetic field to the positive magnetic field and vice versa. Therefore, it is known that this Co thin film 14 has a sufficient coercive force to preserve a recording state.

SECOND PREFERRED EMBODIMENT

Figure 5:
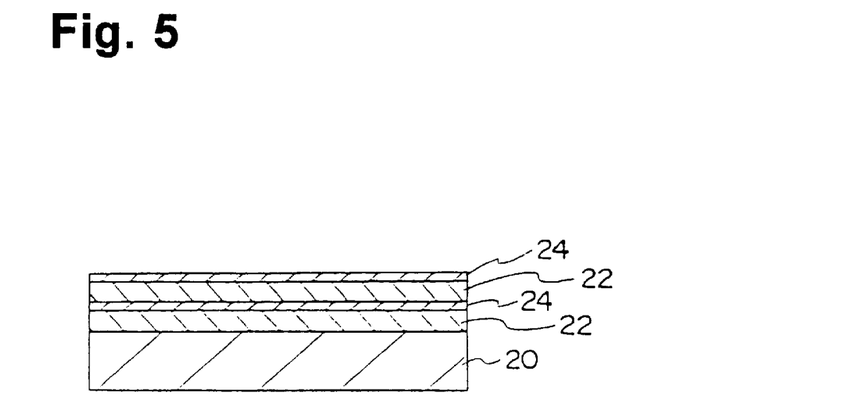
FIG. 5 is a diagram showing a schematic structure of a magneto-optical recording medium according to a second preferred embodiment.

Next, a Co and Pt multi-layered film (Co/Pt) will be described. FIG. 5 shows a structure of this embodiment, in which Pt layers 22 and Co layers 24 are alternately stuck on a Si substrate 20.

Using a recording medium having the above multi-layered structure, a large polar Kerr rotation angle can be obtained in an ultraviolet region, similar to the above embodiment. This thin film is obtained through sequential evaporation of Pt layers 22 and Co layers 24 on the Si substrate 20.

Specifically, a Pt layer 22 and a Co layer 24, each having 0.3 thickness, are alternately formed on an SiN substrate 20 of 80 nm thickness until forty pairs of Pt layers 22 and Co layers 24 constitute a multi-layered film of about 25 nm thickness (Co3/Pt3). Alternatively, a Pt layer 22 of 0.5 nm thickness and a Co layer 24 of 0.3 nm thickness are alternately formed on a similar SiN substrate 20 until thirty pairs constitute a multiple-layered film of 25 nm thickness (Co3/Pt5). Further alternatively, a Pt layer 22 of 1.1 nm thickness and a Co layer 24 of 0.3 nm thickness are alternately formed on the SiN substrate 20 until eighteen pairs constitute a multi-layered film of about 23 nm thickness (Co3/Pt11). Note that the three multi-layered films each have a pure crystalline structure.

Figure 6:
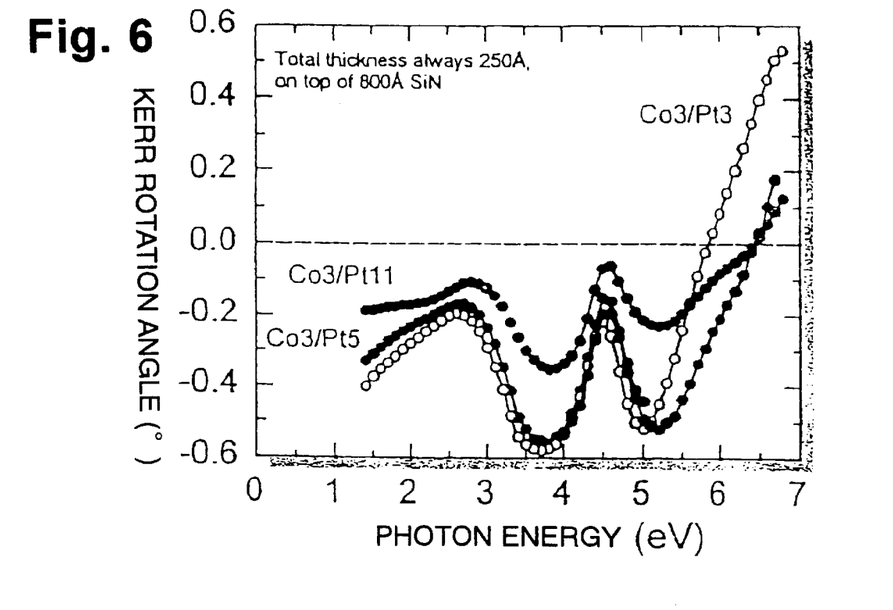
FIG. 6 is a diagram showing the relationship between photon energy and a polar Kerr rotation angle in a magneto-optical recording medium according to the second preferred embodiment.
Figure 7:
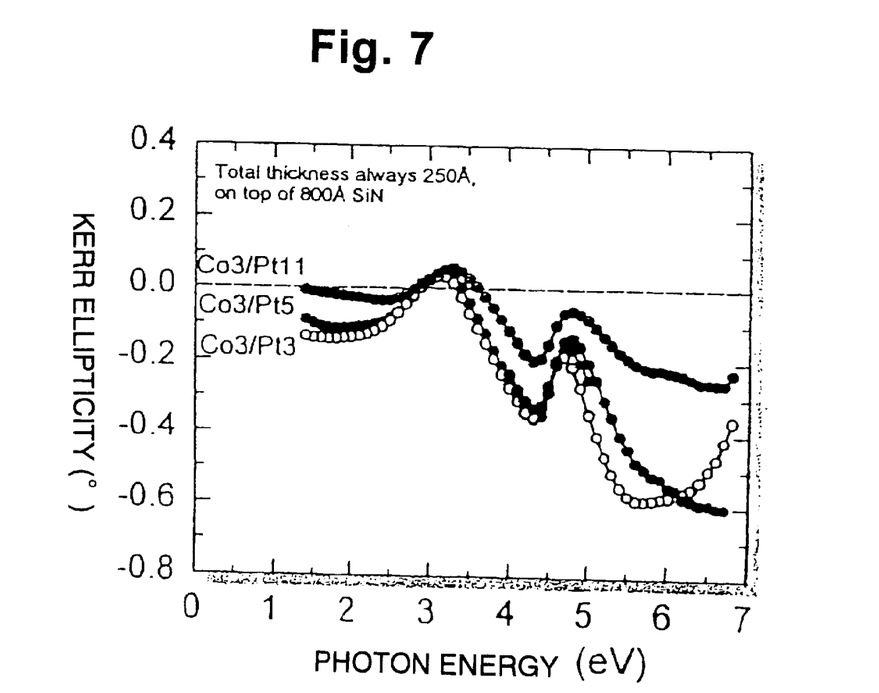
FIG. 7 is a diagram showing the relationship between photon energy and Kerr ellipticity in a magneto-optical recording medium according to the second preferred embodiment.

FIGS. 6 and 7 show polar Kerr effects and Kerr ellipticity of these three multi-layered films, namely Co3/Pt3, Co3/Pt5, and Co3/Pt11. Regarding the multi-layered film Co3/Pt3, a polar Kerr rotation angle shifts from negative to positive with photon energy of about 5.5 eV, and becomes about 0.4° with photon energy of about 6.5 eV. According to this result, it is known that this multi-layered film co3/Pt3 is preferably used as a recording medium using ultraviolet light.

Regarding the multi-layered films Co3/Pt5 and Co3/Pt11, the shift occurs with photon energy of about 6.5 eV. It is presumed that the angle peaks positively in a short-wave region.

Also, the films Co3/Pt3 and Co3/Pt5 have Kerr ellipticity which peaks negatively with photon energy of about 5.5 eV and 6.5 eV, respectively, and this can be utilized. Further, the polar Kerr rotation angles of these films Co3/Pt3 and Co3/Pt5 take a relatively large negative value with photon energy of about 3.7 eV and 5 eV, respectively. This can also be utilized.

THIRD PREFERRED EMBODIMENT

Next, a Co and Pt (CoPt) alloy layer will be described. This alloy layer is generally formed by simultaneously evaporating Co and Pt on a substrate. Alternatively, it may be formed by evaporating a Co and Pt alloy prepared in advance.

Figure 8:
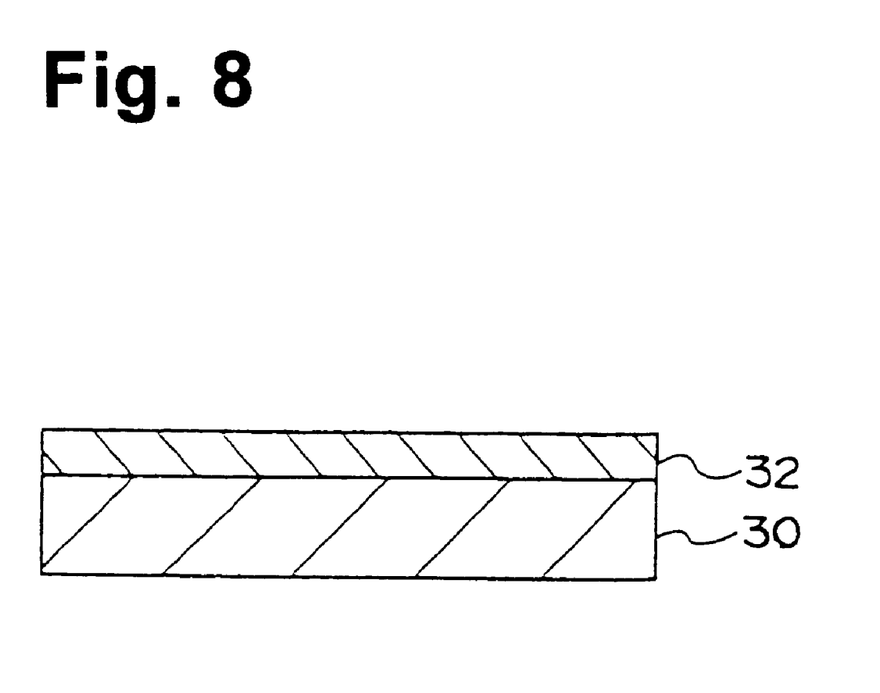
FIG. 8 is a diagram showing a schematic structure of a magneto-optical recording medium according to a third preferred embodiment.

FIG. 8 shows a structure of the alloy layer, in which a $Co_{75}Pt_{25}$ alloy layer 32 is formed on a sapphier ($Al_2O_3$) of about 75 nm thickness through electronic beam evaporation. The base temperature for film formation (the temperature of the base 30) is of the room temperature, or RT, i.e., 400° C.; the degree of vacuum is $10^{-8}$ Torr or over and $10^{-8}$–$10^{-7}$ Torr before and during evaporation, respectively.

According to X-ray and electron diffraction, it is found that the alloy layer 32 obtained through evaporation at a room temperature is an irregular alloy having a hcp structure; that at 400° C. is a regular alloy.

Figure 9:
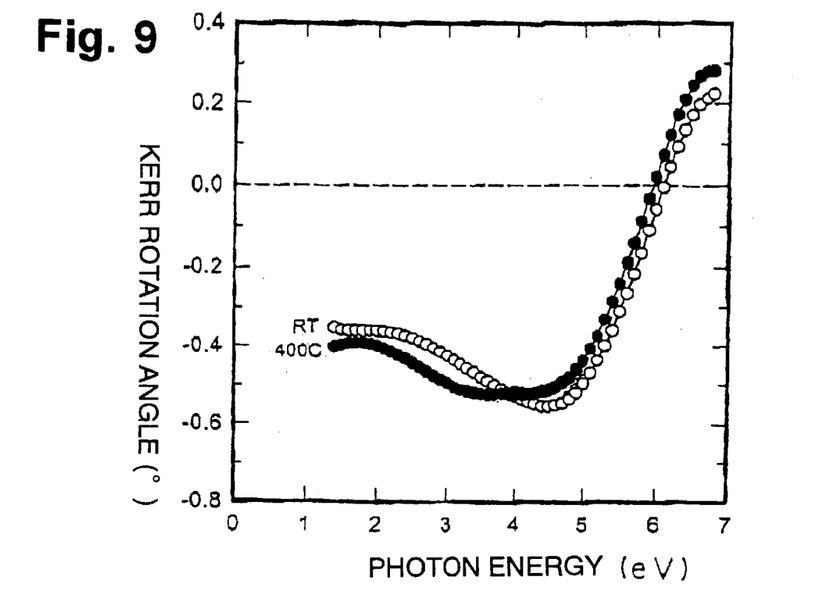
FIG. 9 is a diagram showing the relationship between photon energy and a polar Kerr rotation angle in a magneto-optical recording medium according to the third preferred embodiment.
Figure 10:
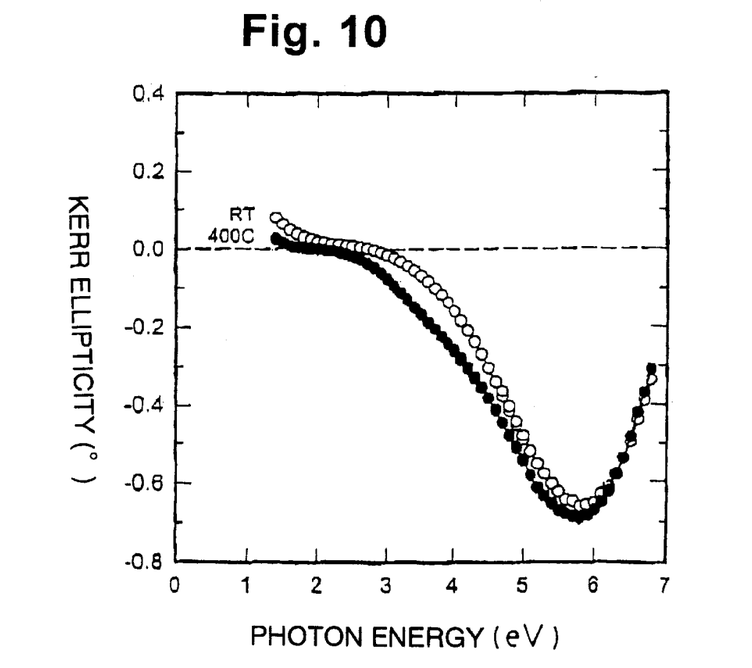
FIG. 10 is a diagram showing the relationship between photon energy and Kerr ellipticity in a magneto-optical recording medium according to the third preferred embodiment.

FIGS. 9 and 10 show dependency of a polar Kerr rotation angle and Kerr ellipticity on photon energy. As shown in FIG. 9, the Kerr rotation angle of the alloy peaks at about −0.6° with photon energy of about 4.5 eV, and rapidly becomes closer to 0° with stronger photon energy, shifting from negative to positive with photon energy around 6 eV. On the other hand, as shown in FIG. 10, the Kerr ellipticity peaks with photon energy of about 5.8 eV.

As shown in FIGS. 9 and 10, it is known that the regular alloy formed at 400° C. has a larger Kerr rotation angle and Kerr ellipticity than the irregular alloy formed at room temperature.

Figure 11:
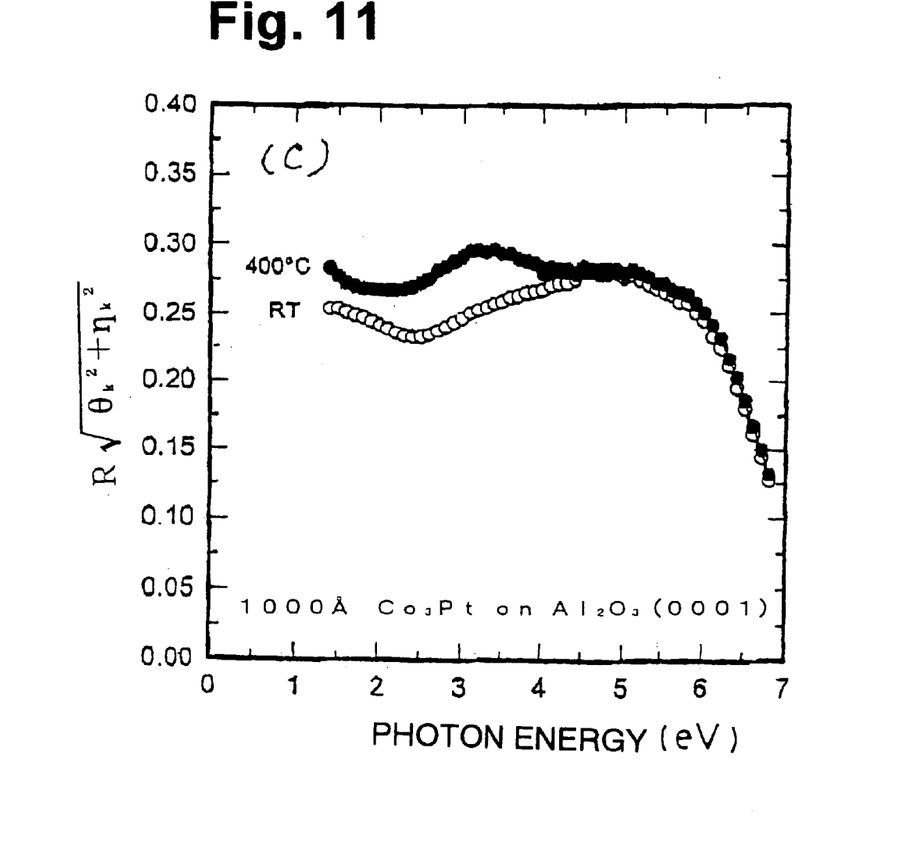
FIG. 11 is a diagram showing the relationship between photon energy and $R\sqrt{[\theta k^2 + \eta k^2]}$.

When such an alloy layer is used as a recording medium, a signal at reproduction is proportional to $Rv[\theta k^2 + \eta k^2]$ ($\theta k$: Kerr rotation angle, $\eta k$: ellapticity, R: reflection rate). FIG. 11 shows dependency of $Rv[\theta k^2 + \eta k^2]$ on photon energy.

Obviously, it shows a very large value, such as 0.25 or over, with respect to photon energy of about 5.5 eV and less. Therefore, it is known that CoPt alloy layer of this embodiment is favorably used as a recording medium.

FOURTH PREFERRED EMBODIMENT

Figure 12:
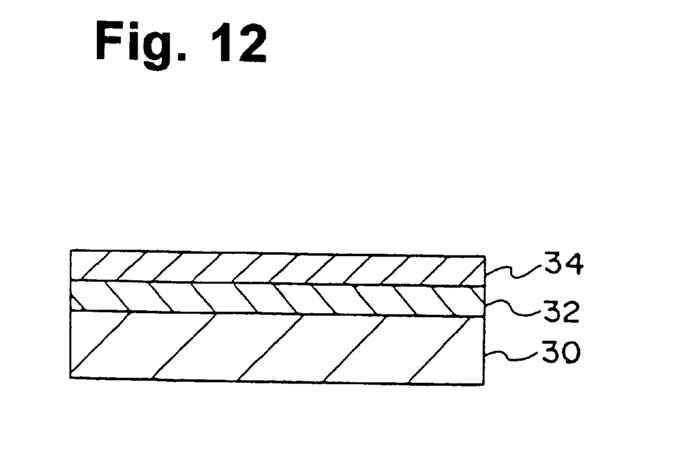
FIG. 12 is a diagram showing a schematic structure of a magneto-optical recording medium according to a third preferred embodiment.

FIG. 12 shows a structure according to a fourth preferred embodiment, which is an alloy layer similar to that of the third preferred embodiment, in which a Pt layer 32 of 20 nm thickness is formed on a glass substrate 30, and a Co and Pt alloy layer 34 having 20 nm thickness is further formed thereon. The weight ratio between Co and Pt of the alloy layer 34 is 1:3. Note that the Pt layer 32 and the alloy layer 34 have a crystalline structure.

Figure 13:
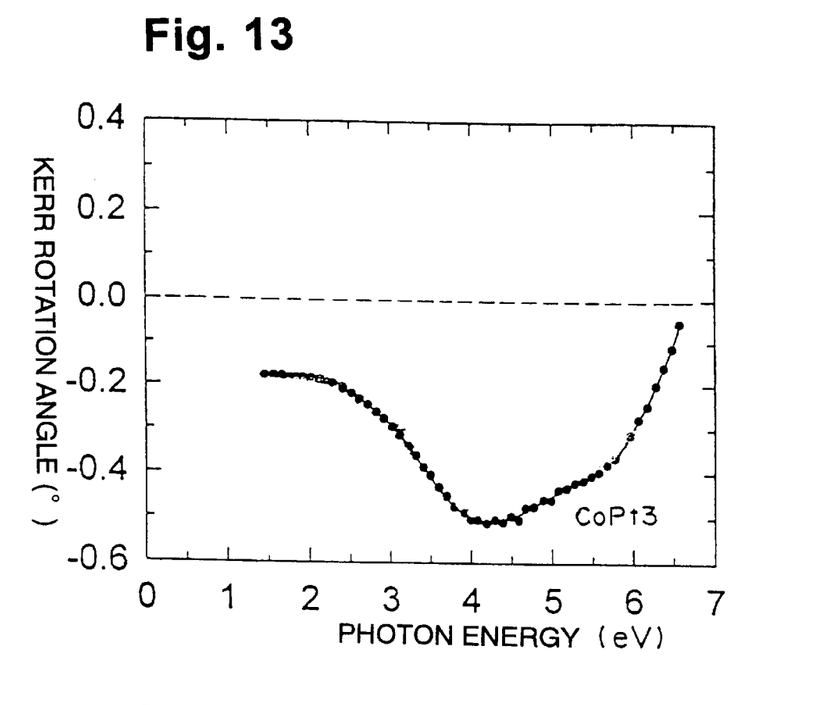
FIG. 13 is a diagram showing the relationship between photon energy and a polar Kerr rotation angle in a magneto-optical recording medium according to the fourth preferred embodiment.
Figure 14:
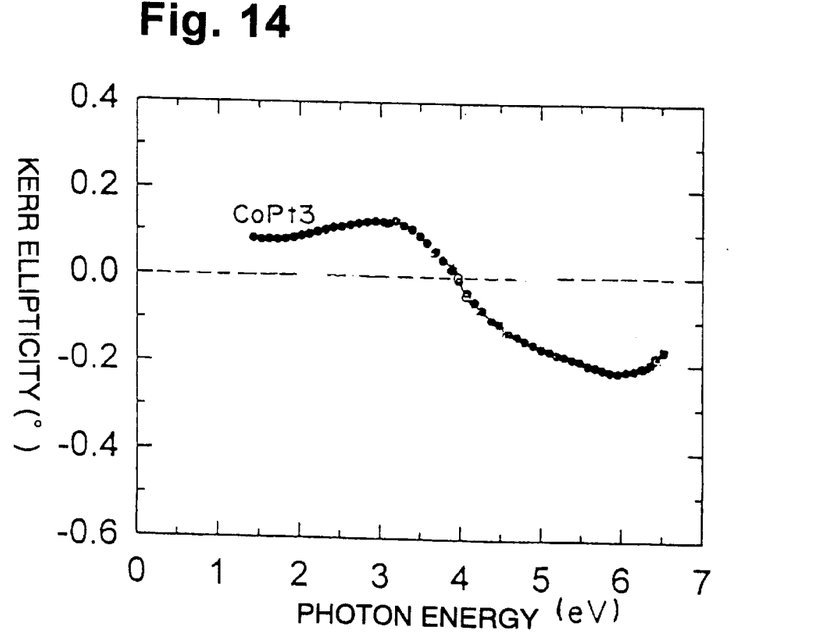
FIG. 14 is a diagram showing the relationship between photon energy and Kerr ellipticity in a magneto-optical recording medium according to the fourth preferred embodiment.

FIGS. 13 and 14 show polar Kerr effects and Kerr ellipticity of such an alloy film (CoPt3). As is shown, the polar Kerr rotation angle is about to shift from negative to positive with photon energy of about 6 eV (a wavelength of 207 nm), and expected to peak positively with respect to short-wave light.

Also, with the alloy film of this embodiment, the polar Kerr rotation angle takes a relatively large negative value with photo energy of about 4–6 eV, which can be utilized.

OTHER

Although only a limited number of actual measurement examples are explained, vertical magnetic anisotropy is obtained with Co-related film, and the coercive force of the film is sufficient. In addition, a polar Kerr rotation angle peaks positively largely in an ultraviolet region. Therefore, a favorable magneto-optic recording medium can be provided by utilizing a Co-related film.

For example, in a multi-layered film including a Co crystalline thin film and a crystalline thin film with R components, R may include at least any one of transition metals, rare-earth elements, Pt, Ta, Zr, Nb, Mo, Ru, Rh, Pd, Ag, Au, and W.

Also, a $Co_{100-x}R_x$ alloy crystalline thin film which includes, as R, at least any one of transition metals, rare-earth elements, Pt, Ta, Zr, Nb, Mo, Ru, Rh, Pd, Ag, Au, and W, can be utilized as a Co-related alloy film.

It should be noted that although a crystalline thin film was taken as an example in all of the above examples, an amorphous Co thin film, an amorphous multi-layered film, or an amorphous alloy film may be used instead.

Also note that the "positive" and "negative" relationship of the aforementioned Kerr rotation angle and Kerr ellipticity is determined generally such that the clockwise direction in view of the direction in which the irradiating light proceeds with respect to the medium proceeds is regarded as positive. This is similar to the documents which disclose conventional designs (except, Jpn. J. Appl. Phys. Vol. 32 (1993) Pt. 1, No. 2, pp. 989–995, in which the "positive" and "negative" relationship is determined opposite to that of this application).

MAGNETO-OPTICAL RECORDER

Figure 15:
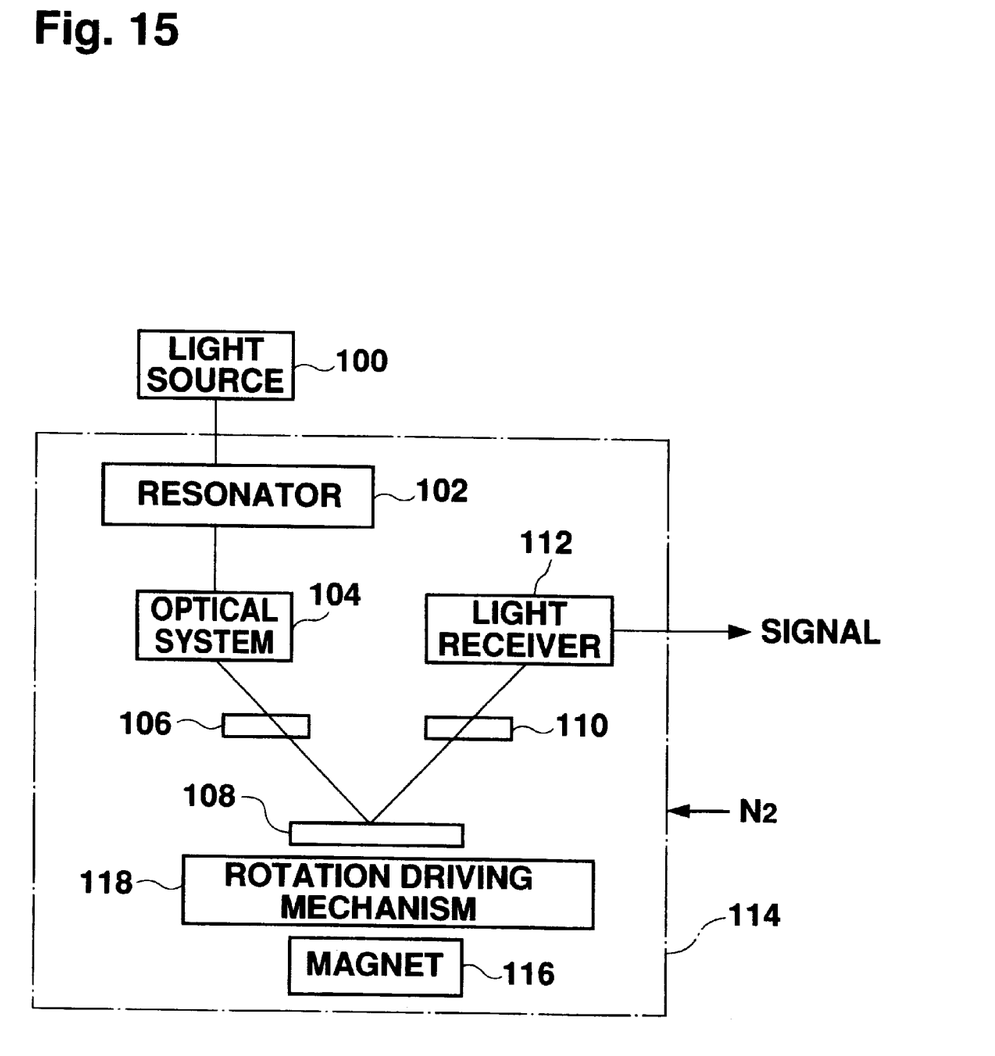
FIG. 15 is a diagram showing a schematic structure of a magneto-optical recorder.

FIG. 15 shows a schematic structure of a device using the aforementioned magneto-optical recording medium, which comprises a light source 100 as a source of light in an ultraviolet region, and a resonator 102. The light source may be GaN semiconductor laser for emitting light of 375 nm. The light of 375 nm is converted in the resonator 102 into light having a half wavelength. That is, the crystal resonator 102 repeatedly reciprocates incoming light through reflection so that the wavelength is reduced to half by means of frequency doubling.

Then, the ultraviolet light is converted into a predetermined spot through an optical system 104 before being transformed into linear polarization having a predetermined angle in a polarizing section 106 and then irradiating the magneto-optical recording medium 108. The magneto-optical recording medium 108 has the aforementioned Co-related thin film and a large polar Kerr rotation angle with respect to ultraviolet light.

After being reflected by the magneto-optical recording medium 108, the light is supplied to a detection section 110, where light having a predetermined angle is selected to be transmitted to a light receiving section 112. Therefore, the light receiving section 112 can detect whether or not a predetermined rotation of a polarized aspect was made in the magneto-optical recording medium 108, so that recorded data can be read. Note that a known driving mechanism may be preferably provided for moving an irradiation spot to the magneto-optical recording medium 108, or for other purposes.

Further, in this embodiment, a portion responsible for irradiation and reception of ultraviolet light is accommodated in a vessel 114. The vessel 114 is basically sealed and set in a nitrogen atmosphere. Therefore, favorable reading is achieved while minimizing absorption of ultraviolet light in an atmosphere.

Still further, a magnet 116 is provided in the vicinity of the magneto-optical medium 108 so that the medium 108 is placed in a predetermined magnetic field. When a relatively strong light ray irradiates a magneto-optical recording medium 108 in a mono-directional magnetic field, a vertically magnetized minute region (a vertically magnetized region) corresponding to the magnetic field is given to the irradiated spot. Two types of vertically magnetized regions can then be given to every spot according to the direction of the magnetic field. By corresponding the spots to data of "0" and "1", information can be recorded.

Recorded data can then be read by detecting the reflected light with a rotated plane of polarization by using relatively weak light.

It should be noted that a rotation driving mechanism 118 rotates the magneto-optical recording medium 108. That is, the magneto-optical recording medium 108, which is generally discal, is generally rotated by the rotation driving mechanism 118 to be thereby moved in the radical direction of the medium 108 so as to irradiate a desired spot on the medium 108.

INDUSTRIAL APPLICABILITY

It is usable as a data recording medium for use in computers, visual audio equipment, or the like.

What is claimed is:

1. A magneto-optical recording medium for recording information by utilizing magneto-optical effects of a metallic thin film;

the magneto thin film being a $Co_{75}Pt_{25}$ alloy crystalline thin film, and the magneto-optical effects being a polar Kerr rotation angle or Kerr ellipticity with an absolute value equal to or greater than 0.1° with respect to ultraviolet light having a wavelength equal to or less than 400 nm.

2. A magneto-optical recording medium according to claim 1, wherein the metallic thin film has vertical magnetic anisotropy which is a magnetic anisotropy in a normal direction of the thin film.

3. A magneto-optical recording medium according to claim 1, wherein the metallic thin film has magneto-optical effect which is a polar Kerr rotation angle or Kerr ellipticity equal to or greater than 0.1° with respect to ultraviolet light having a wavelength equal to or less than 200 nm.

4. A magneto-optical recording medium according to claim 1, wherein the metallic thin film has a negative Kerr rotation angle in most of a visible light region, and a positive polar Kerr rotation angle equal to or greater than 0.1° in a visible light region with a short wavelength or an ultraviolet region.

5. A magneto-optical recording medium for recording information by utilizing magneto-optical effects of a metallic thin film;

the magneto thin film comprising Co, the magneto-optical effects being a polar Kerr rotation angle or Kerr ellipticity with an absolute value equal to or greater than 0.1° with respect to ultraviolet light having a wavelength equal to or less than 400 nm, the metallic thin film being a multi-layer film including a Co crystalline thin film and a crystalline thin with R components, R is at least one of transition metals, rare-earth elements, Pt, Ta, Zr, Nb, Mo, Ru, Rh, Pd, Ag, Au and W.

6. A magneto-optical recording medium according to claim 5, wherein the metallic thin film has magneto-optical effect which is a polar Kerr rotation angle or Kerr ellipticity equal to or greater than 0.1° with respect to ultraviolet light having a wavelength equal to or less than 200 nm.

7. A magneto-optical recording medium according to claim 5 wherein the metallic thin film has a negative Kerr rotation angle in most of a visible light region, and a positive polar Kerr rotation angle equal to or greater than 0.1° in a visible light region with a short wavelength.

8. A magneto-optical recording device using a magneto-optical recording medium for recording information by utilizing magneto-optical effects of a metallic thin film;

the magneto thin film comprising Co, the magneto-optical effects being a polar Kerr rotation angle and/or Kerr ellipticity which have/has an absolute value equal to or greater than 0.1° with respect to ultraviolet light having a wavelength equal to or less than 400 nm, the magneto-optical recording devise comprising
      irradiation means for irradiating ultraviolet light having a wavelength equal to or less than 400 nm onto a magneto-optical recording medium, and
      a vessel for enclosing the magneto-optical recording medium in an atmosphere with a small absorption rate of ultraviolet light.

9. A device according to claim 8, wherein the irradiation means includes frequency doubling means for converting light supplied from a light source into light having a half wavelength by means of frequency doubling, and the magneto-optical recording means is irradiated by light from a light source after halving the wavelength thereof.

* * * * *